United States Patent
Kurasawa

(10) Patent No.: US 12,293,578 B2
(45) Date of Patent: May 6, 2025

(54) OBJECT DETECTION METHOD, OBJECT DETECTION APPARATUS, AND NON-TRANSITORY COMPUTER-READABLE STORAGE MEDIUM STORING COMPUTER PROGRAM

(71) Applicant: SEIKO EPSON CORPORATION, Tokyo (JP)

(72) Inventor: Hikaru Kurasawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 586 days.

(21) Appl. No.: 17/535,141

(22) Filed: Nov. 24, 2021

(65) Prior Publication Data

US 2022/0164577 A1 May 26, 2022

(30) Foreign Application Priority Data

Nov. 25, 2020 (JP) .................... 2020-194817

(51) Int. Cl.
G06V 10/82 (2022.01)
G06V 10/40 (2022.01)
G06V 10/74 (2022.01)
G06V 10/94 (2022.01)
G06V 20/00 (2022.01)

(52) U.S. Cl.
CPC .............. *G06V 20/00* (2022.01); *G06V 10/40* (2022.01); *G06V 10/74* (2022.01); *G06V 10/82* (2022.01); *G06V 10/95* (2022.01)

(58) Field of Classification Search
None
See application file for complete search history.

(56) References Cited

U.S. PATENT DOCUMENTS

| 2018/0260669 A1 | 9/2018 | Konishi | |
| 2022/0134435 A1* | 5/2022 | Scime | G06T 7/11 264/112 |
| 2023/0121146 A1* | 4/2023 | Yamamoto | G06V 10/98 340/944 |
| 2023/0386167 A1* | 11/2023 | Fuelster | G06V 10/776 |

FOREIGN PATENT DOCUMENTS

| JP | 2018-151748 A | 9/2018 | |
| WO | WO-2022243337 A2 * | 11/2022 | G06V 10/764 |

OTHER PUBLICATIONS

Seferbekov, S.—"Feature Pyramid Network for Multi-Class Land Segmentation"—arXiv—Jun. 19, 2018—pp. 4321-4324 (Year: 2018).*
Silva, C.—"Towards Open-Set Semantic Segmentation of Aerial Images"—arXiv—Jan. 27, 2020—pp. 1-7 (Year: 2020).*
Prove, P.L.—"An Introduction to different Types of Convolutions in Deep Learning"—Towards Data Science—Jul. 22, 2017—pp. 1-8 (Year: 2017).*

* cited by examiner

*Primary Examiner* — Bernard Krasnic
(74) *Attorney, Agent, or Firm* — Oliff PLC

(57) ABSTRACT

An object detection method includes inputting an input image to a learned machine learning model and generating a similarity image from an output of at least one specific layer, and generating a discriminant image to which at least an unknown label is assigned, by comparing a similarity of each pixel in the similarity image to a predetermined threshold value.

4 Claims, 12 Drawing Sheets

FIG. 2
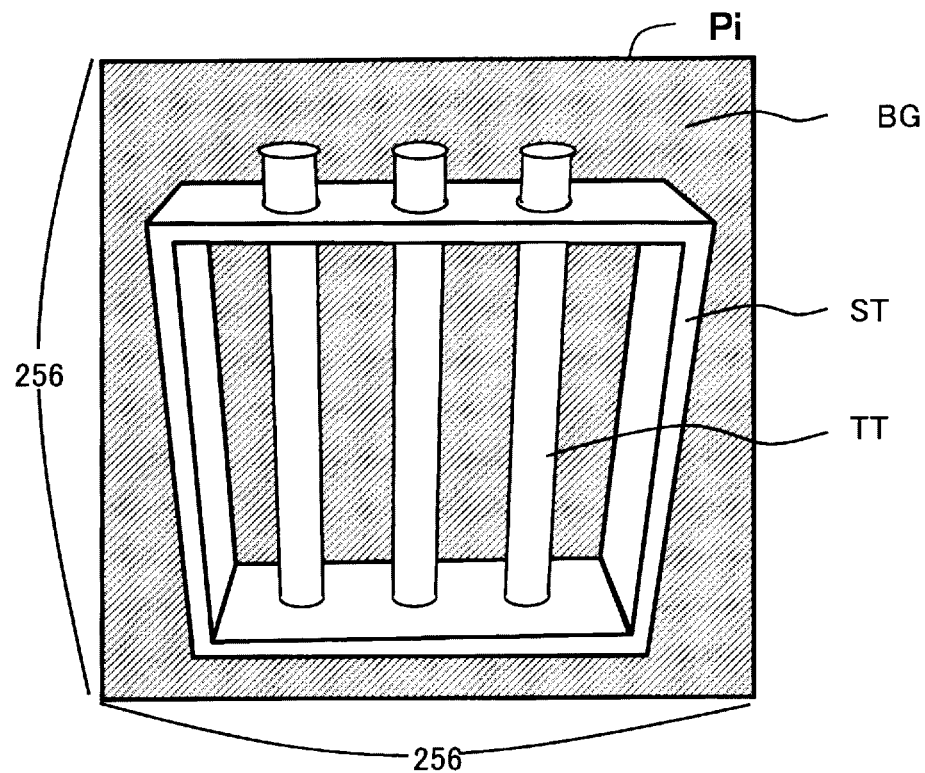
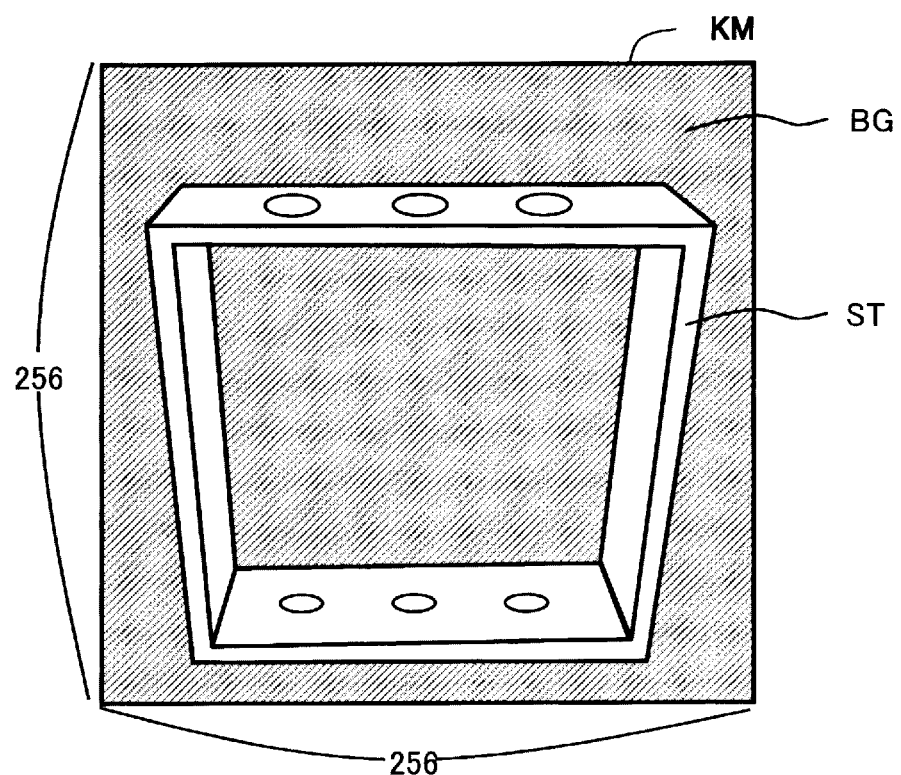

FIG. 5
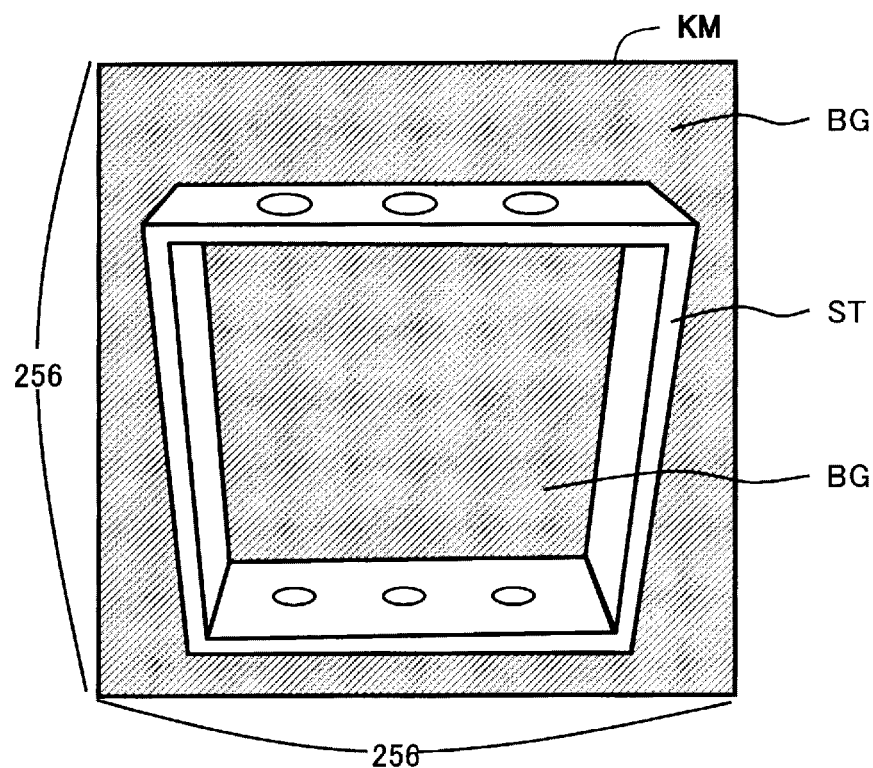
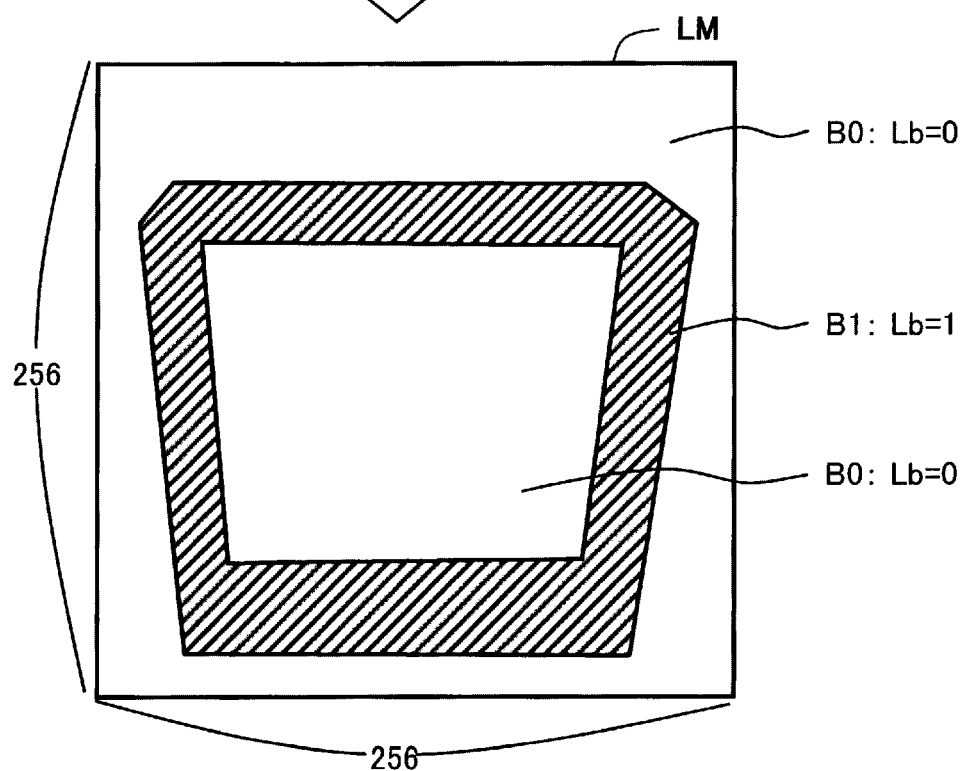

FIG. 8

| No. | LAYER NAME | LABEL Lb | KNOWN FEATURE SPECTRUM KSp |
|---|---|---|---|
| 1 | ConvVN1 | 0 | ............................................. |
| 2 | ConvVN1 | 0 | ............................................. |
| ... | ... | ... | ............................................. |
| ... | ConvVN1 | 0 | ............................................. |
| ... | ConvVN1 | 1 | ............................................. |
| ... | ConvVN1 | 1 | ............................................. |
| ... | ... | ... | ............................................. |
| N1max | ConvVN1 | 1 | ............................................. |

KSG_ConvVN1, KSG_ConvVN2, KSG_ClassVN

OBJECT DETECTION METHOD, OBJECT DETECTION APPARATUS, AND NON-TRANSITORY COMPUTER-READABLE STORAGE MEDIUM STORING COMPUTER PROGRAM

The present application is based on, and claims priority from JP Application Serial Number 2020-194817, filed Nov. 25, 2020, the disclosure of which is hereby incorporated by reference herein in its entirety.

BACKGROUND

1. Technical Field

The present disclosure relates to an object detection method, an object detection apparatus, and a non-transitory computer-readable storage medium storing a computer program for detecting an object from an input image.

2. Related Art

JP-A-2018-151748 discloses a technique for performing high-speed object recognition using template matching. In this technique, first, a plurality of standard templates having different resolutions are created, and then a common template representing the common portion of the plurality of standard templates and an identification template representing the difference portion between the plurality of templates are created. The high-speed object recognition is realized by using the standard template in a matching process at a higher-layer level, and using the common template representing the common portion between the templates and the identification template representing the difference portion between the templates, in a matching process at a lower-layer level.

However, in the above-described technique, object recognition is performed by template matching. Thus, there is a problem that it is not possible to detect an object, for example, when it is not possible to prepare a template for an object or when an object is transparent, and thus it is not possible to perform matching well. Thus, a technique capable of detecting an object from an input image by a method different from the template matching in the related art is desired.

SUMMARY

According to a first aspect of the present disclosure, there is provided an object detection method for causing one or more processors to detect an object from an input image by using a vector neural network type machine learning model having a plurality of vector neuron layers. The machine learning model is configured to, when a patch image having a predetermined size smaller than the input image is input to the machine learning model, output a determination value indicating that the patch image belongs to one of a plurality of classes. The object detection method includes generating a similarity image by inputting the input image to the machine learning model, and obtaining a similarity from an output of at least one specific layer among the plurality of vector neuron layers for each pixel of the specific layer, the similarity indicating a degree of being similar to a feature of any class among the plurality of classes, and generating a discriminant image including at least an unknown label by comparing the similarity of each pixel in the similarity image to a predetermined threshold value, and, when the similarity is less than the threshold value, assigning the unknown label to the pixel.

According to a second aspect of the present disclosure, there is provided an object detection apparatus that detects an object from an input image. The object detection apparatus includes a memory that stores a vector neural network type machine learning model having a plurality of vector neuron layers, and one or more processors that execute an object detection process using the machine learning model. The machine learning model is configured to, when a patch image having a predetermined size smaller than the input image is input to the machine learning model, output a determination value indicating that the patch image belongs to one of a plurality of classes. The one or more processors are configured to perform generating a similarity image by inputting the input image to the machine learning model, and obtaining a similarity from an output of at least one specific layer among the plurality of vector neuron layers for each pixel of the specific layer, the similarity indicating a degree of being similar to a feature of any class among the plurality of classes, and generating a discriminant image including at least an unknown label by comparing the similarity of each pixel in the similarity image to a predetermined threshold value, and, when the similarity is less than the threshold value, assigning the unknown label to the pixel.

According to a third aspect of the present disclosure, there is provided a non-transitory computer-readable storage medium storing a program causing a processor to execute an object detection process of detecting an object from an input image using a vector neural network type machine learning model having a plurality of vector neuron layers. The machine learning model is configured to, when a patch image having a predetermined size smaller than the input image is input to the machine learning model, output a determination value indicating that the patch image belongs to one of a plurality of classes. The computer program causes the processor to execute a process of generating a similarity image by inputting the input image to the machine learning model, and obtaining a similarity from an output of at least one specific layer among the plurality of vector neuron layers for each pixel of the specific layer, the similarity indicating a degree of being similar to a feature of any class among the plurality of classes, and a process of generating a discriminant image including at least an unknown label by comparing the similarity of each pixel in the similarity image to a predetermined threshold value, and, when the similarity is less than the threshold value, assigning the unknown label to the pixel.

BRIEF DESCRIPTION OF THE DRAWINGS

FIG. 2 is a diagram illustrating an example of an input image and a known image.

FIG. 5 is a diagram illustrating a label image obtained by separating a region from a known image.

FIG. 8 is a diagram illustrating a configuration of a known feature spectrum group.

DESCRIPTION OF EXEMPLARY EMBODIMENTS

Figure 1:
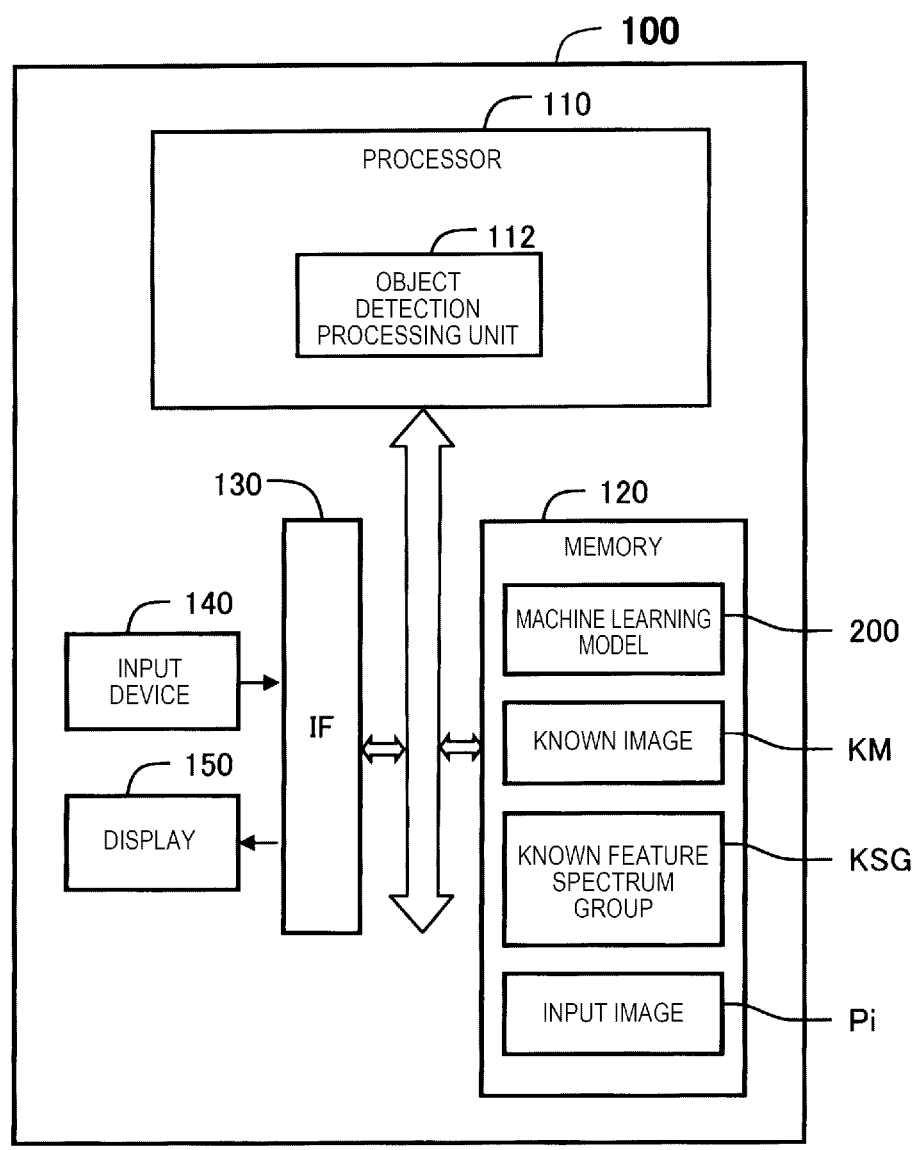
FIG. 1 is a block diagram illustrating an information processing apparatus according to an embodiment.

FIG. 1 is a block diagram illustrating a function of an information processing apparatus 100 according to an embodiment. The information processing apparatus 100 includes a processor 110, a memory 120, an interface circuit 130, and an input device 140 and a display 150 which are coupled to the interface circuit 130. Although not limited, for example, the processor 110 has not only a function of executing processes described in detail below, but also a function of causing the display 150 to display an output image, a similarity image, and a discriminant image, which are obtained by the processes, and pieces of data generated during the processes. The information processing apparatus 100 can be realized by a computer such as a personal computer.

The processor 110 functions as an object detection processing unit 112 that detects an object from an input image. The object detection processing unit 112 is realized by the processor 110 executing a computer program stored in the memory 120. The object detection processing unit 112 may be realized by a hardware circuit. The processor in this specification refers to a term that also includes such a hardware circuit. The memory 120 stores a vector neural network type machine learning model 200, a known image KM, a known feature spectrum group KSG, and an input image Pi. The machine learning model 200 is used for an object detection process by the object detection processing unit 112. A configuration example and an operation of the machine learning model 200 will be described later. The known image KM is an image as a source of teacher data used for learning of the machine learning model 200. The known feature spectrum group KSG is a group of feature spectra obtained when the teacher data is input to the learned machine learning model 200 again. The feature spectrum will be described later. The input image Pi is an image as a process target of the object detection process. The known image KM is necessary only during learning of the machine learning model 200, and is not necessary during execution of the object detection process on the input image Pi. The input image Pi does not need to be stored in the memory 120 during learning of the machine learning model 200.

FIG. 2 is a diagram illustrating an example of an input image Pi and a known image KM. The input image Pi is an image in which a test tube rack ST is installed in a dark background BG, and a transparent glass test tube TT is set in the test tube rack ST. In the object detection process in the present embodiment, a process of detecting the test tube TT from the input image Pi is executed assuming that the background BG and the test tube rack ST are known, and the test tube TT is an unknown object. Therefore, an image in which the test tube TT as a detection target is not present and the background BG and the test tube rack ST are present is prepared as the known image KM used for learning of the machine learning model 200, in advance by capturing of a camera, for example. That is, the input image Pi is an image including the unknown object TT which is not present in the known image KM in addition to the background BG and the object ST which are present in the known image KM. As the known image KM, it is preferable to use a plurality of images captured by one or a plurality of cameras from a plurality of different directions in the same disposition state. Each of the background BG and the objects ST and TT is referred to as an "image region" or an "image component" below. In general, it is known that machine learning is difficult for a transparent body such as a test tube TT because the appearance of the transparent body changes greatly depending on the surrounding environment such as specular reflection of a light source, reflection of the surroundings, and transmission of a background BG. As will be described below, in the present embodiment, the vector neural network type machine learning model 200 is used, and thus it is possible to easily detect a transparent object with a small amount of learning.

Figure 3:
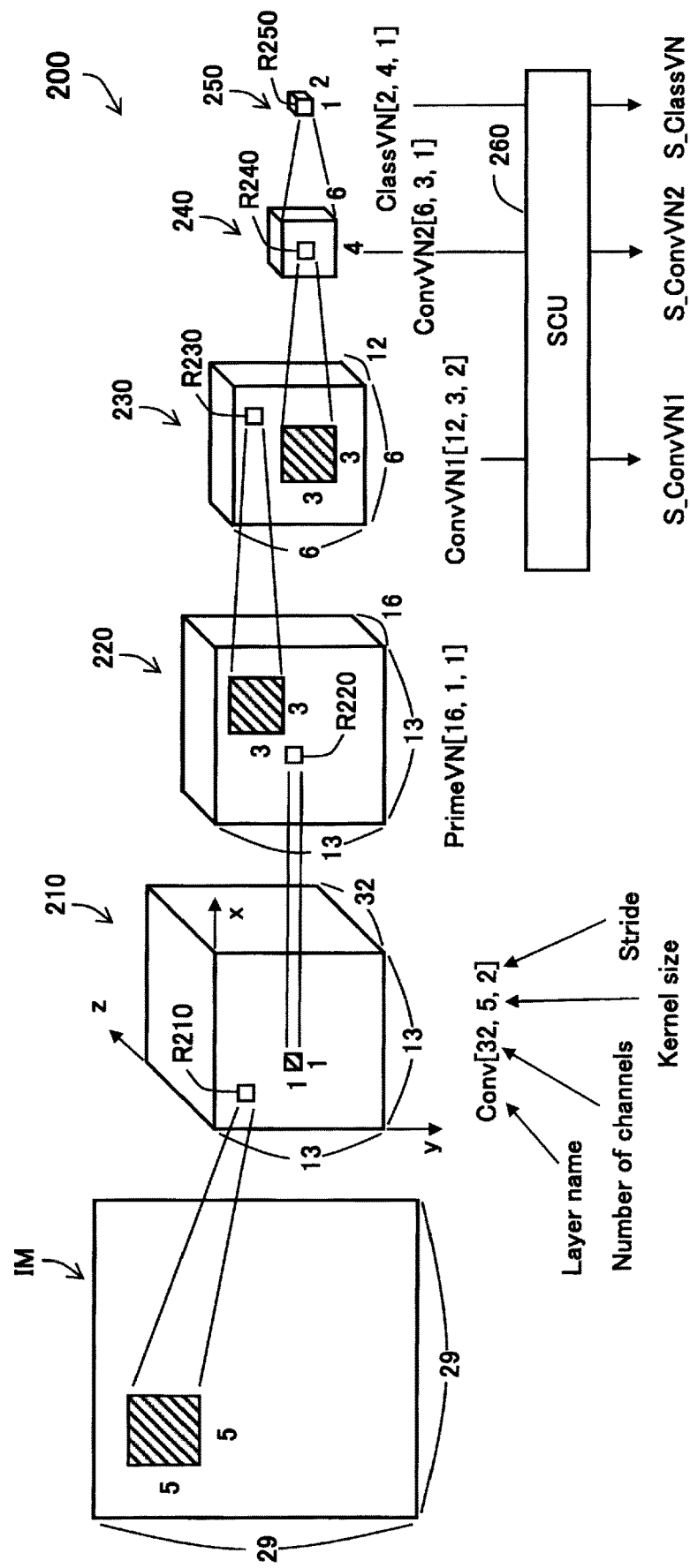
FIG. 3 is a diagram illustrating a configuration of a machine learning model in a preparation step.

FIG. 3 is a diagram illustrating an example of a configuration of the machine learning model 200 during learning. The machine learning model 200 includes a convolution layer 210, a primary vector neuron layer 220, a first convolution vector neuron layer 230, a second convolution vector neuron layer 240, and a classification vector neuron layer 250 in order from input data IM side. Among the five layers 210 to 250, the convolution layer 210 is the lowest layer, and the classification vector neuron layer 250 is the highest layer. In the following description, the layers 210 to 250 are also referred to as a "Conv layer 210", a "PrimeVN layer 220", a "ConvVN1 layer 230", a "ConvVN2 layer 240", and a "ClassVN layer 250", respectively.

In the example in FIG. 3, the two convolution vector neuron layers 230 and 240 are used, but the number of convolution vector neuron layers is randomly set, and the convolution vector neuron layer may be omitted. It is preferable to use one or more convolutional vector neuron layers.

The machine learning model 200 in FIG. 3 further includes a similarity calculation unit 260 that generates a similarity image. The similarity calculation unit 260 is capable of calculating similarity images S_ConvVN1, S_ConvVN2, and S_ClassVN, which will be described later, from outputs of the ConvVN1 layer 230, the ConvVN2 layer 240, and the ClassVN layer 250, respectively.

The configuration of each of the layers 210 to 250 can be described as follows.

<Description of Configuration of Each Layer>
Layer 210: Conv[32,5,2]
Layer 220: PrimeVN[16,1,1]
Layer 230: ConvVN1[12,3,2]
Layer 240: ConvVN2[6,3,1]
Layer 250: ClassVN[2,4,1]
Vector dimension VD: VD=16

In the description of each of the layers 210 to 250, the character string before the parentheses indicates the layer name, and the numbers in the parentheses indicate the number of channels, the kernel size, and the stride in this order. For example, the layer name of the Conv layer 210 is "Conv", the number of channels is 32, the kernel size is 5×5, and the stride is 2. In FIG. 3, such descriptions are shown below each layer. The hatched rectangle drawn in each layer represents the kernel used to calculate an output vector of the adjacent higher layer. The values of the parameters used in the description of each of the layers 210 to 250 are an example, and can be randomly changed.

The Conv layer 210 is a layer configured by scalar neurons. The other four layers 220 to 250 are layers configured by vector neurons. A vector neuron is a neuron that inputs and outputs a vector. In the above description, the dimension of an output vector of each vector neuron is constant at 16. The term of a "node" is used below as a superordinate concept of scalar neurons and vector neurons.

In FIG. 3, for the Conv layer 210, a first axis x and a second axis y for defining plane coordinates of a node arrangement and a third axis z representing the depth are illustrated. FIG. 3 illustrates that the sizes of the Conv layer 210 in x, y, and z directions are 13, 13, and 32. The size in the x direction and the size in the y direction are referred to as a "resolution". In this example, the resolutions in the x and y directions are equal to each other, but may be different from each other. The size in the z direction indicates the number of channels. The three axes x, y, and z are also used as coordinate axes indicating the position of each node in other layers. In FIG. 3, the illustrations of the axes x, y, and z are omitted in the layers other than the Conv layer 210.

As is well known, a resolution W1 after convolution is given by an expression as follows.

$$W1 = \text{Ceil}\{(W0 - Wk + 1)/S\} \quad (1)$$

Here, W0 indicates the resolution before the convolution, Wk indicates the kernel size, S indicates the stride, and Ceil{X} indicates a function that rounds up X.

The resolution of each layer illustrated in FIG. 3 is an example when the resolution of the input data is set to be 29×29 pixels. The actual resolution of each layer is appropriately changed in accordance with the size of the input data.

Each node of the PrimeVN layer 220 considers scalar outputs of 1×1×32 nodes of the Conv layer 210 as a 32-dimensional vector, and obtains a vector output of the corresponding node by multiplying the 32-dimensional vector by a transformation matrix. The transformation matrix is an element of the 1×1 kernel and is updated by learning of the machine learning model 200. The processes of the Conv layer 210 and the PrimeVN layer 220 can be integrated to form one primary vector neuron layer.

When the PrimeVN layer 220 is referred to as a "lower layer L", and the ConvVN1 layer 230 adjacent to the higher side is referred to as a "higher layer (L+1)", an output of each node of the higher layer (L+1) is determined by using an expression as follows.

[Math. 1]

$$v_{ij} = W_{ij}^L M_i^L \quad (2)$$

$$u_j = \Sigma_i v_{ij} \quad (3)$$

$$a_j = F(\|u_j\|) \quad (4)$$

$$M_j^{L+1} = a_j \times \frac{1}{\|u_j\|} u_j. \quad (5)$$

Here, $M_i^L$ indicates an output vector of the i-th node in the lower layer L. $M_j^{L+1}$ indicates an output vector of the j-th node in the higher layer (L+1). $v_{ij}$ indicates a prediction vector of the output vector $M_j^{L+1}$. $W_{ij}^L$ indicates a prediction matrix for calculating the prediction vector $v_{ij}$ from the output vector $M_i^L$ of the lower layer L. $u_j$ indicates a sum vector being the sum of the prediction vectors $v_{ij}$, that is, a linear combination. $a_j$ indicates an activation value being a normalization coefficient obtained by normalizing the norm $|u_j|$ of the sum vector $u_j$. F(X) indicates a normalization function that normalizes X.

As the normalization function F(X), for example, the expression (4a) or expression (4b) as follows can be used.

[Math. 2]

$$a_j = F(\|u_j\|) = \text{softmax}(\|u_j\|) = \frac{\exp(\beta\|u_j\|)}{\Sigma_k \exp(\beta\|u_k\|)} \quad (4a)$$

$$a_j = F(\|u_j\|) = \frac{\|u_j\|}{\Sigma_k \|u_k\|}. \quad (4b)$$

Here, k indicates the ordinal number for all nodes of the higher layer (L+1). B indicates an adjustment parameter that is a certain positive coefficient, for example, B=1.

In the above expression (4a), the activation value $a_j$ is obtained by normalizing the norm $|u_j|$ of the sum vector $u_j$ for all the nodes of the higher layer (L+1) with a softmax function. In the expression (4b), the activation value $a_j$ is obtained by dividing the norm $|u_j|$ of the sum vector $u_j$ by the sum of the norms $|u_j|$ for all the nodes of the higher layer (L+1). As the normalization function F(X), a function other than the expression (4a) or the expression (4b) may be used.

The ordinal number i of the above expression (3) is conveniently assigned to the node of the lower layer L used to determine the output vector $M_j^{L+1}$ of the j-th node in the higher layer (L+1). The ordinal number i takes a value of 1 to n. The integer n indicates the number of nodes of the lower layer L used to determine the output vector $M_j^{L+1}$ of the j-th node in the higher layer (L+1). Thus, the integer n is given by an expression as follows.

$$n = Nk \times Nc \quad (6)$$

Here, Nk indicates the number of kernel elements, and Nc indicates the number of channels of the PrimeVN layer 220 being the lower layer. In the example in FIG. 3, Nk=9 and Nc=16, so n=144.

One kernel used to obtain the output vector of the ConvVN1 layer 230 has 3×3×16=144 elements in which a kernel size of 3×3 is set as a surface size, and 16 being the number of channels of the lower layer is set as the depth. Each of the elements refers to the prediction matrix $W_{ij}^L$. 12 sets of this kernel are required to generate output vectors of 12 channels of the ConvVN1 layer 230. Thus, the number of kernel prediction matrices $W_{ij}^L$ used to obtain the output vector of the ConvVN1 layer 230 is 144×12=1728. The prediction matrices $W_{ij}^L$ are updated by learning of the machine learning model 200.

As can be known from the above expressions (2) to (5), the output vector $M_j^{L+1}$ of each node of the higher layer (L+1) is obtained by the calculation as follows.

(a) Obtain the prediction vector $v_{ij}$ by multiplying the output vector $M_i^L$ of each node in the lower layer L by the prediction matrix $W_{ij}^L$.

(b) Obtain the sum vector $u_j$, which is the sum of the prediction vectors $v_{ij}$ obtained from each node of the lower layer L, that is, the linear combination.

(c) Obtain the activation value $a_j$ being the normalization coefficient by normalizing the norm $|u_j|$ of the sum vector $u_j$.

(d) Divide the sum vector $u_j$ by the norm $|u_j|$ and then multiply the resultant of the division by the activation value $a_j$ The activation value $a_j$ is a normalization coefficient obtained by normalizing the norm $|u_j|$ for all the nodes in the higher layer (L+1). Thus, the activation value $a_j$ can be considered as an index indicating the relative output intensity of each node among all the nodes in the higher layer (L+1). The norms used in the expressions (4), (4a), (4b), and (5) are L2 norms representing vector lengths in a typical example. At this time, the activation value $a_j$ corresponds to the vector length of the output vector $M^{L+1}{}_j$. Since the activation value $a_j$ is only used in the above expressions (4) and (5), it does not need to be output from the node. The higher layer (L+1) can be configured to output the activation value $a_j$ to the outside.

The configuration of the vector neural network is substantially the same as the configuration of a capsule network. The vector neurons of the vector neural network correspond to capsules of the capsule network. The calculations by the above-described expressions (2) to (5) used in the vector neural network are different from the calculations used in the capsule network. The biggest difference between the calculation used in the vector neural network and the calculation used in the capsule network is that, in the capsule network, the prediction vector $v_{ij}$ on the right side of the above expression (3) is multiplied by a weight, and the weight is searched by repeating dynamic routing a plurality of times. On the other hand, in the vector neural network in the present embodiment, the output vector $M^{L+1}{}_j$ can be obtained by calculating the above expressions (2) to (5) once in order. Thus, there are advantages that it is not necessary to repeat dynamic routing and the calculation is performed faster. Further, the vector neural network in the present embodiment has advantages that the memory amount required for the calculation is less than the required memory amount in the capsule network, and, according to the experiment of the inventor of the present disclosure, the memory amount is reduced to about ½ to ⅓.

The vector neural network is the same as the capsule network in that nodes that input and output vectors are used. Thus, the advantages of using vector neurons are also common to the capsule network. The vector neural network is the same as a general convolutional neural network in that, regarding the plurality of layers 210 to 250, the higher layer expresses features of the larger region, and the lower layer expresses features of the smaller region. Here, the "feature" means a characteristic portion included in the input data to the vector neural network. The vector neural network and the capsule network are superior to the general convolutional neural network in that the output vector of a certain node contains spatial information representing the spatial information of the features expressed by this node. That is, the vector length of the output vector of a certain node represents the presence probability of the feature expressed by the node, and the vector direction represents the spatial information such as the direction and scale of the feature. Thus, the vector directions of the output vectors of two nodes belonging to the same layer represent a positional relation between the features. Alternatively, the vector directions of the output vectors of the two nodes can represent variations of the features. For example, in the case of a node corresponding to the feature of "eyes", the direction of the output vector may represent variations such as fineness of eyes and a form of raising the eyes. In the general convolutional neural network, the spatial information of the feature can be lost by a pooling process. As a result, the vector neural network and the capsule network have an advantage of being superior to the general convolutional neural network in the performance of identifying the input data.

The advantages of the vector neural network can also be considered as follows. That is, in the vector neural network, there is an advantage that the output vector of the node expresses the feature of input data as the coordinates in a continuous space. Thus, the output vector can be evaluated so that the features are similar when the vector directions are close to each other. There is also an advantage that, even though it is not possible to cover the feature included in the input data by the teacher data, it is possible to discriminate the features by interpolation. On the other hand, the general convolutional neural network has a drawback that disorderly compression is applied by the pooling process, and thus it is not possible to express the feature of the input data as the coordinates in the continuous space.

The outputs of the nodes of the ConvVN2 layer 240 and the ClassVN layer 250 are also determined in the similar manner by using the above-described expressions (2) to (5). Thus, detailed description thereof will be omitted. The resolution of the ClassVN layer 250 being the highest layer is 1×1, and the number of channels is 2. The number of channels in the ClassVN layer 250 is generally set to be equal to the number of labels used in the teacher data.

The method of obtaining the outputs of the nodes of each of the layers 210 to 250 can also be described as follows. By applying a 5×5 kernel to input data IM with a stride "2", a partial range of a range of the input data IM, which is output to one node of the Conv layer 210 is determined. The number of kernels applied to the input data IM is 32. Thus, the Conv layer 210 is configured so that each of the first axis x and the second axis x has a region divided into 13 parts. The number of channels, which is the depth of the Conv layer 210, is configured to be 32 which is equal to the number of kernels. The "partial range" is a region on the input data IM, and is one region specified by the position of the first axis x and the position of the second axis y. As is clear from the following description, the size of the "partial range" varies depending on which of the vector neuron layers 220, 230, 240, and 250 one or more nodes corresponding to the "partial range" or a "partial region Rn" configured by the one or more nodes belongs to. The "partial region Rn" is a region specified by the position of the first axis x and the position of the second axis y in the vector neuron layer. Each "partial region Rn" in the vector neuron layer has dimensions of "Width"×"Height"×"Depth" corresponding to the first axis x, the second axis x, and the third axis z. In the present embodiment, the number of nodes included in one "partial region Rn" is "1×1×(number of depths)", that is, "1×1×(number of channels)". In the present specification, the subscripts "n" of the partial region Rn are substituted with the numerical values of "220", "230", "240", and "250" depending on the vector neuron layers 220, 230, 240, and 250. For example, a partial region R220 indicates a region in the PrimeVN layer 220.

By applying a 1×1×32 kernel to the Conv layer 210 with a stride "1", a partial region R210 to be output to one node of the PrimeVN layer 220 is determined in the partial region R210 of the Conv layer 210. Here, since 16 types of kernels are used with the same size and the same stride, the number of nodes corresponding to one partial region R210 of the Conv layer 210, in the PrimeVN layer 220, is 16. A transformation matrix is used to generate the output from the node of the Conv layer 210 to the node of the PrimeVN layer 220, and the output determination algorithm represented by the above expressions (2) to (5) is not used. The kernel dimension for convolution into the vector neuron layer may be expressed as "Width"×"Height"×"Depth"×"number of vector elements" when the number of channels and the number of vector elements are also taken into consideration. According to this expression, the kernel dimensions used for convolution from the Conv layer 210 to the PrimeVN layer 220 are 1×1×32×16.

By applying a 3×3×16 kernel to the PrimeVN layer 220 with a stride "2", a partial region R220 to be output to the node included in one partial region R230 of the ConvVN1 layer 230 is determined from a partial region R220 of the PrimeVN layer 220. Here, since 12 types of kernels are used with the same size, the same dimensions, and the same stride, the number of nodes included in the partial region R230 of the ConvVN1 layer 230 is 12. The output determination algorithm represented by the above expressions (2) to (5) is used to generate the output from the node of the PrimeVN layer 220 to the node of the ConvVN1 layer 230. Here, it is expressed that the kernel applied to the lower layer 220 designates 3×3×16 nodes of the lower layer 220 used to determine one node of the higher layer 230. This is also applied to the following description.

By applying a 3×3×12 kernel to the ConvVN1 layer 230 with a stride "1", a partial region R230 to be output to one partial region R240 of the ConvVN2 layer 240 is determined from the partial region R230 of the ConvVN1 layer 230. Here, since 6 types of kernels are used with the same size, the same dimensions, and the same stride, the number of nodes included in the partial region R240 of the ConvVN2 layer 240 is 6. When the node of the ConvVN2 layer 240 is generated from the node of the ConvVN1 layer 230, the output determination algorithm represented by the above expressions (2) to (5) is used.

By applying a 4×4×6 kernel to the ConvVN2 layer 240 with a stride "1", a partial region R240 to be output to one partial region R250 of the ClassVN layer 250 is determined from the partial region R240 of the ConvVN2 layer 240. Here, since 2 types of kernels are used with the same size, the same dimensions, and the same stride, the number of nodes included in the partial region R250 of the ClassVN layer 250 is 2. When the node of the ClassVN layer 250 is generated from the node of the ConvVN2 layer 240, the output determination algorithm represented by the above expressions (2) to (5) is used.

The ClassVN layer 250 being the highest layer is configured by one partial region R250. In the ClassVN layer 250, the input data IM input to the machine learning model 200 is classified into predetermined labels. In the present embodiment, the predetermined labels are a label "0" and a label "1". In the ClassVN layer 250, the label corresponding to the node having the maximum activation value $a_j$ out of the two nodes is output. The label output from the ClassVN layer 250 is controlled by the processor 110 to be output by the display 150.

In FIG. 3, one partial region R220 of the PrimeVN layer 220 corresponds to a partial range of 5×5 pixels in the input data IM. One partial region R230 of the ConvVN1 layer 230 corresponds to a partial range of 9×9 pixels in the input data IM. The partial region R240 of the ConvVN2 layer 240 corresponds to a partial range of 17×17 pixels in the input data IM. The partial region R250 of the ClassVN layer 250 corresponds to a partial range of 29×29 pixels in the input data IM.

Figure 4:
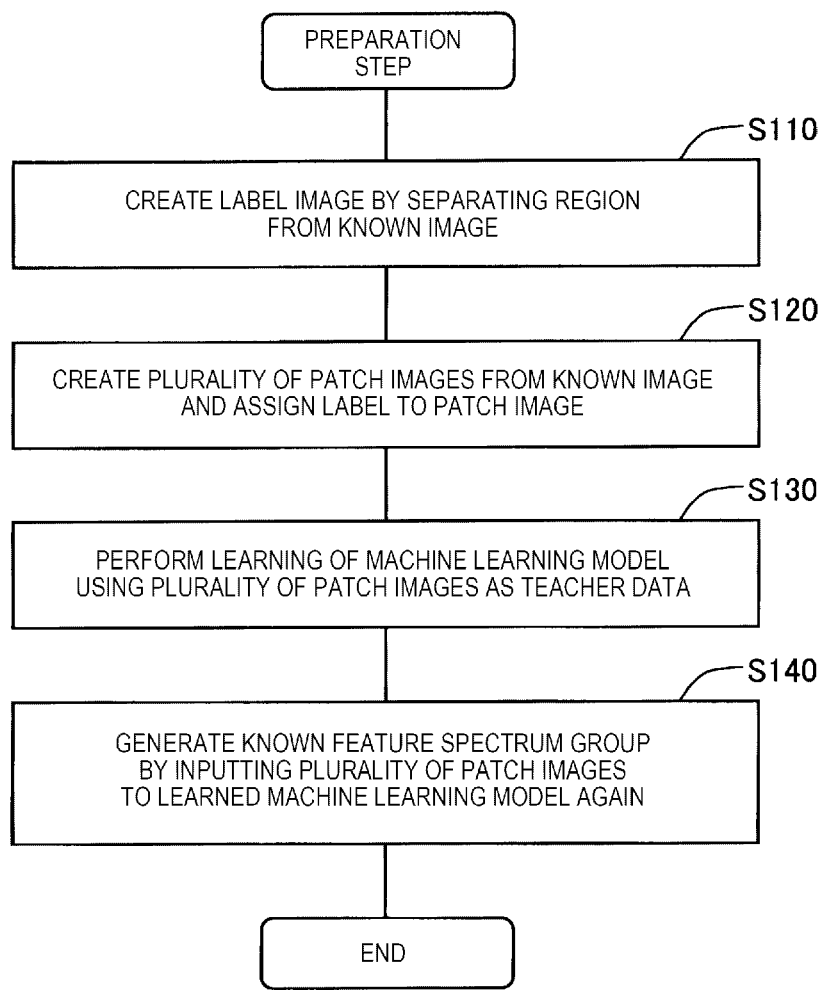
FIG. 4 is a flowchart illustrating a process procedure of the preparation step.

FIG. 4 is a flowchart illustrating a process procedure of a preparation step of performing learning of the machine learning model 200. In Step S110, the object detection processing unit 112 creates a label image by separating a region from a known image KM.

FIG. 5 is a diagram illustrating a region separation process of creating a label image LM from a known image KM. When the region separation process is executed on the known image KM, the known image KM is separated into a plurality of image regions B0 and B1. The first image region B0 corresponds to the background BG of the known image KM, and the second image region B1 corresponds to the test tube rack ST. Labels Lb different from each other are assigned to the plurality of image regions B0 and B1. In the example in FIG. 5, the label Lb of the first image region B0 is 0, and the label Lb of the second image region B1 is 1. Any method may be used for the region separation process. For example, a user may assign a label manually or by using a known contour extraction algorithm. Distance information may be given by using a depth sensor when a camera captures an image of a target object, and the same label may be assigned to a target at a depth close to this information. In other words, the label image LM may be created automatically by the object detection processing unit 112, or may be created by a user of the information processing apparatus 100. In the mechanical region separation process, the background BG is separated into a background region outside the test tube rack ST and a background region inside the test tube rack ST. Thus, it is preferable that the user corrects the labels so that the same labels are assigned to the background regions. This is similarly applied to the test tube rack ST. The label image LM is an image in which one of a plurality of labels Lb=0 and Lb=1 for distinguishing the plurality of image regions B0 and B1 from each other is attached to each pixel.

In Step S120 in FIG. 4, the object detection processing unit 112 creates a plurality of patch images Pc from the known image KM, and creates teacher data by assigning one label to each patch image Pc.

Figure 6:
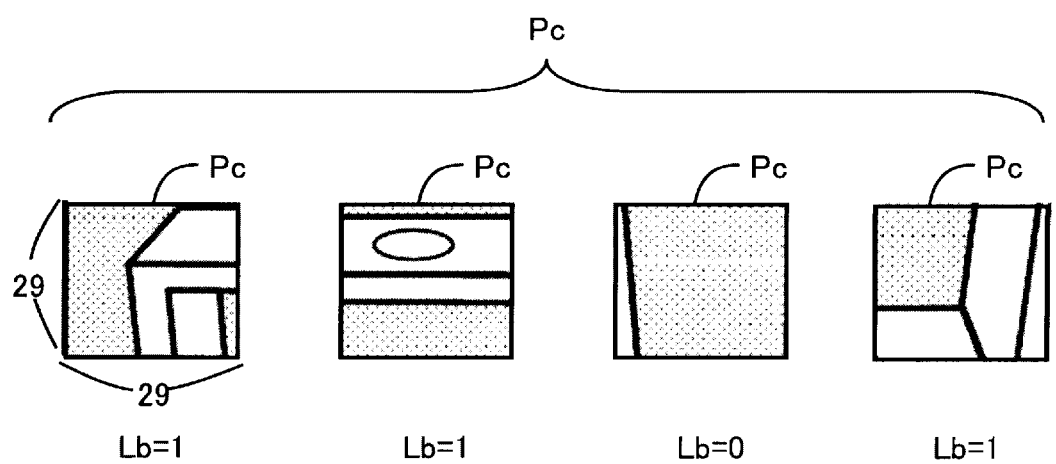
FIG. 6 is a diagram illustrating a plurality of patch images extracted from the known image.

FIG. 6 is a diagram illustrating an example of the plurality of patch images Pc extracted from the known image KM. The number Np of patch images Pc obtained by the extraction is given by an expression as follows.

$$Np = \text{Ceil}\{(Wx-Hx+1)/T\} \times \text{Ceil}\{(Wy-Hy+1)/T\} \quad (7)$$

Here, Wx and Wy indicate the resolutions of the known image KM, Hx and Hy indicate the resolutions of the patch image Pc, T indicates the stride, and Ceil{X} indicates a function that rounds up X.

In the present embodiment, Wx=Wy=256, Hx=Hy=29, T=2, and Np=12996. As a method of extracting the patch image Pc, other methods may be adopted. It is preferable that the plurality of patch images Pc are extracted so as to be able to cover the entirety of the known image KM.

One label Lb is associated with each patch image Pc. It is assumed that the label Lb is a label Lb for the image component having the largest area in the patch image Pc out of the image components BG and ST of the known image KM, which are included in the patch image Pc. Alternatively, the label to be assigned to the patch image Pc can be assigned as a set of a plurality of continuous values. For example, two labels of Lb_0=0.25 and Lb_1=0.75 may be assigned to a patch image Pc in which a ratio between the background BG and the test tube rack ST being the two image components is 1:3. Labels of the continuous values can be learned by using the output of the ClassVN layer 250 in the vector neural network as the continuous values of the activation value a. The "continuous values" do not mean discrete values such as 1, 2, and 3, but values including numerical values after the decimal point.

In the example in FIG. 6, a label Lb of one patch image Pc3 (second from the right in FIG. 6) is 0, and labels Lb of the other three patch images Pc1, Pc2, and Pc4 are 1. The labels Lb can be determined from the correspondence between the known image KM and the label image LM illustrated in FIG. 5 and the position of each patch image Pc in the known image KM. The association of the label Lb with the patch image Pc may be automatically performed by the object detection processing unit 112, or may be performed by the user of the information processing apparatus 100.

In Step S130 in FIG. 4, the object detection processing unit 112 performs learning of the machine learning model 200 using a plurality of patch images Pc as teacher data. In one example, learning was performed with a batch size of 128, a learning rate of 0.001, and an epoch of 5000. As a result of the learning, the accuracy of label discrimination for the patch image Pc was 1.0.

The output of the ClassVN layer 250 is converted to a plurality of determination values for classes of which the number is equal to the number of labels Lb, but the illustration thereof is omitted in FIG. 3. In the present embodiment, the outputs of the two nodes of the ClassVN layer 250 are converted to determination values for two classes corresponding to the labels of Lb=0 and Lb=1. The determination values are generally values normalized by the softmax function. Specifically, the determination values for the two classes can be obtained by performing, for example, a calculation in which the vector length of the output vector of each node in the ClassVN layer 250 is calculated from the output vector, and further, the vector lengths of two nodes are normalized by the softmax function. As described above, the activation value $a_j$ obtained by the above expression (4) is a value corresponding to the vector length of the output vector $M^{L+1}_j$ and is normalized. Thus, the activation values $a_j$ in the two nodes of the ClassVN layer 250 may be output and used themselves as the determination values for the two classes.

It can be understood that, when the patch image Pc having a predetermined size smaller than the input image Pi is input to the learned machine learning model 200, the machine learning model 200 is configured to output the determination value indicating that the input patch image Pc belongs to one of a plurality of classes. When the learning using the plurality of patch images Pc is ended, the learned machine learning model 200 is stored in the memory 120.

In Step S140 in FIG. 4, a plurality of patch images Pc are input again to the learned machine learning model 200 to generate a known feature spectrum group KSG. The known feature spectrum group KSG is a group of feature spectra described below.

Figure 7:
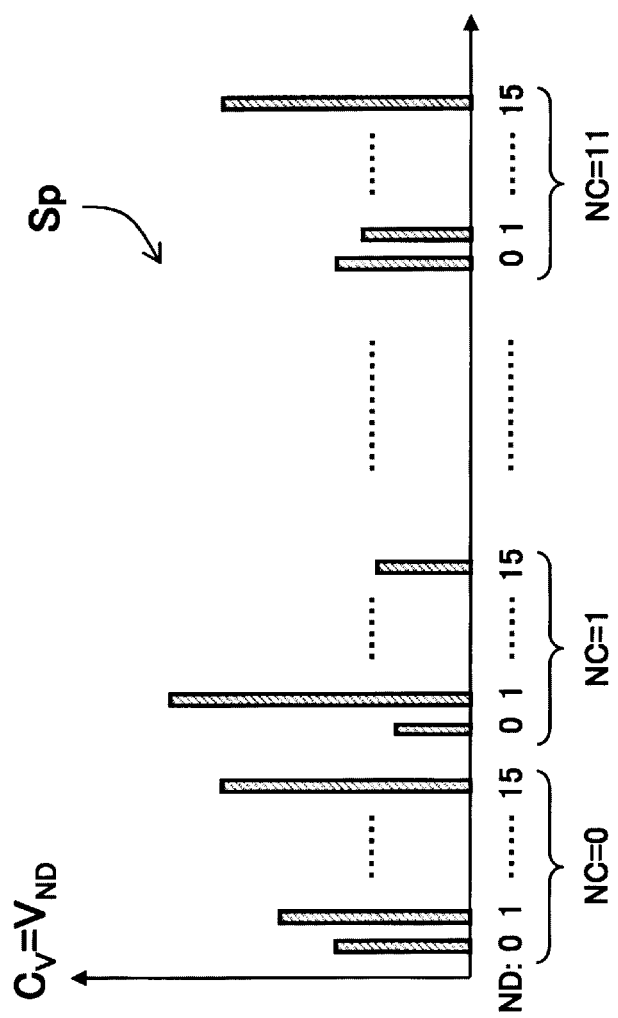
FIG. 7 is a diagram illustrating a feature spectrum used to calculate a similarity.

FIG. 7 is a diagram illustrating a feature spectrum Sp obtained by inputting a certain piece of input data to the learned machine learning model 200. Here, the feature spectrum Sp obtained from the output of the ConvVN1 layer 230 will be described. A horizontal axis in FIG. 7 indicates a spectrum position represented by a combination of the element number ND and the channel number NC of the output vector of a node at one plane position (x, y) of the ConvVN1 layer 230. In the present embodiment, the number of vector dimensions of the node is 16, so the number of element numbers ND of the output vector is 16 from 0 to 15. The number of channels of the ConvVN1 layer 230 is 12, so the number of channel numbers NC is 12 from 0 to 11.

A vertical axis in FIG. 7 indicates a feature value $C_V$ at each spectrum position. In this example, the feature value $C_V$ corresponds to a value $V_{ND}$ of each element of the output vector. As the feature value $C_V$, a value $V_{ND} \times a_j$ obtained by multiplying the value $V_{ND}$ of each element of the output vector and the activation value $a_j$ of that node may be used, or the activation value $a_j$ itself may be used. In the latter case, the number of feature values $C_V$ included in the feature spectrum Sp is equal to the number of channels, which is 12.

The number of feature spectra Sp obtained from the output of the ConvVN1 layer 230 for one piece of input data is equal to the number of plane positions (x, y) of the ConvVN1 layer 230, which is 6×6=36. Similarly, for one piece of input data, 16 feature spectra Sp are obtained from the output of the ConvVN2 layer 240, and one feature spectrum Sp is obtained from the output of the ClassVN layer 250.

When the plurality of patch images Pc are input to the learned machine learning model 200 again, the similarity calculation unit 260 calculates the feature spectrum Sp illustrated in FIG. 7 and registers the calculated feature spectrum in the known feature spectrum group KSG.

FIG. 8 is a diagram illustrating the configuration of the known feature spectrum group KSG. In this example, the known feature spectrum group KSG includes a known feature spectrum group KSG_ConvVN1 obtained from the output of the ConvVN1 layer 230, a known feature spectrum group KSG_ConvVN2 obtained from the output of the ConvVN2 layer 240, and a known feature spectrum group KSG_ClassVN obtained from the output of the ClassVN layer 250.

Each record of the known feature spectrum group KSG_ConvVN1 contains a record number, a layer name, a label Lb, and a known feature spectrum KSp. Each record may further include other items such as an individual data name of teacher data TD and the upper left coordinates of a portion corresponding to the feature spectrum Sp in the input data IM. The known feature spectrum KSp is the same as the feature spectrum Sp in FIG. 4 obtained in response to the input of the patch image Pc. In the example of FIG. 5, when the plurality of patch images Pc are input to the learned machine learning model 200, N1_0max pieces of known feature spectra KSp associated with the label Lb=0 and N1_1max pieces of known feature spectra KSp associated with the label Lb=1 are obtained from the output of the ConvVN1 layer 230, and then are registered. N1_0max and N1_1max indicate integers of 2 or more, respectively. As described above, the label Lb=0 and the label Lb=1 correspond to classes different from each other, respectively. Thus, it can be understood that each known feature spectrum KSp in the known feature spectrum group KSG_ConvVN1 is associated with one of the plurality of classes, and then is registered. This is similarly applied to the other known feature spectrum groups KSG_ConvVN2 and KSG_ClassVN.

The plurality of patch images Pc used in Step S120 do not have a need to be the same as the plurality of patch images Pc used in Step S110. When some or all of the plurality of patch images Pc used in Step S110 are also used in Step S120, an advantage that it is not necessary to prepare a new patch image is obtained.

When the preparation step including the learning of the machine learning model 200 is ended in this manner, an object detection step of performing object detection on the input image Pi is executed at any timing.

Figure 9:
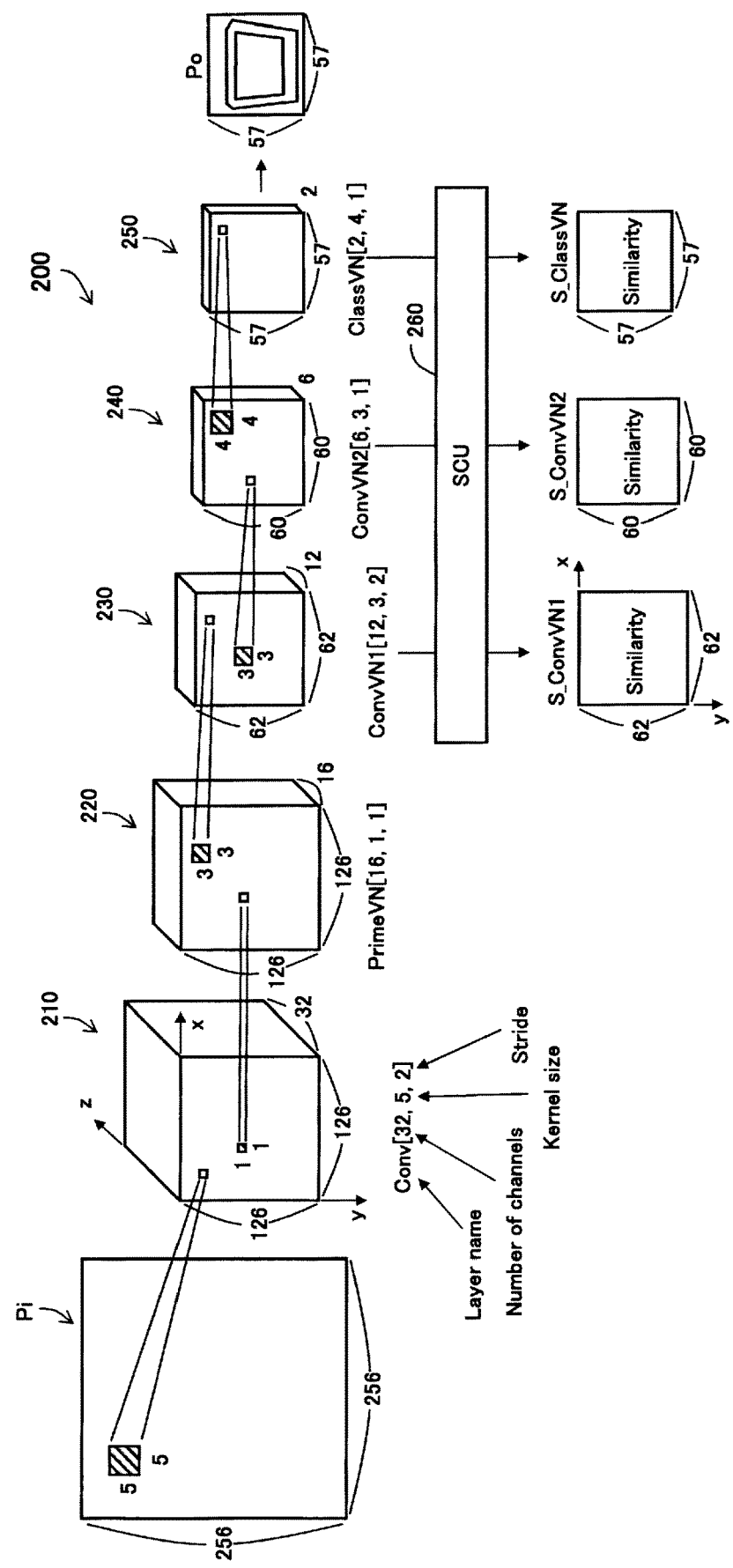
FIG. 9 is a diagram illustrating a configuration of the machine learning model in an object detection process.

FIG. 9 is a diagram illustrating the configuration of the machine learning model 200 in the object detection step. A difference from the machine learning model 200 in the preparation step illustrated in FIG. 3 is that an input image Pi is used as input data in FIG. 9, and as a result, the resolutions of the layers 210 to 250 are different from those in FIG. 3. Others are the same as those in FIG. 3. The calculations in the layers 210 to 250 are also the same as those already described with reference to FIG. 3.

In the configuration in FIG. 9, an output image Po in which a known label Lb is attached to each pixel is output from the ClassVN layer 250 being the highest layer. The output image Po is obtained by integrating labels Lb output from nodes of two channels at the respective plane positions (x, y). That is, a determination value indicating which class of the two labels Lb=0 and Lb=1 the node corresponds to is output from the nodes of the two channels at each plane position (x, y). The output image Po is an image in which the determination values at each plane position (x, y) are integrated and one label Lb is assigned to the pixel at each plane position (x, y). In the example in FIG. 9, the resolution of the output image Po is 57×57 pixels. It may be assumed that the object detection processing unit 112 generates the output image Po from the output of the ClassVN layer 250.

Figure 10:
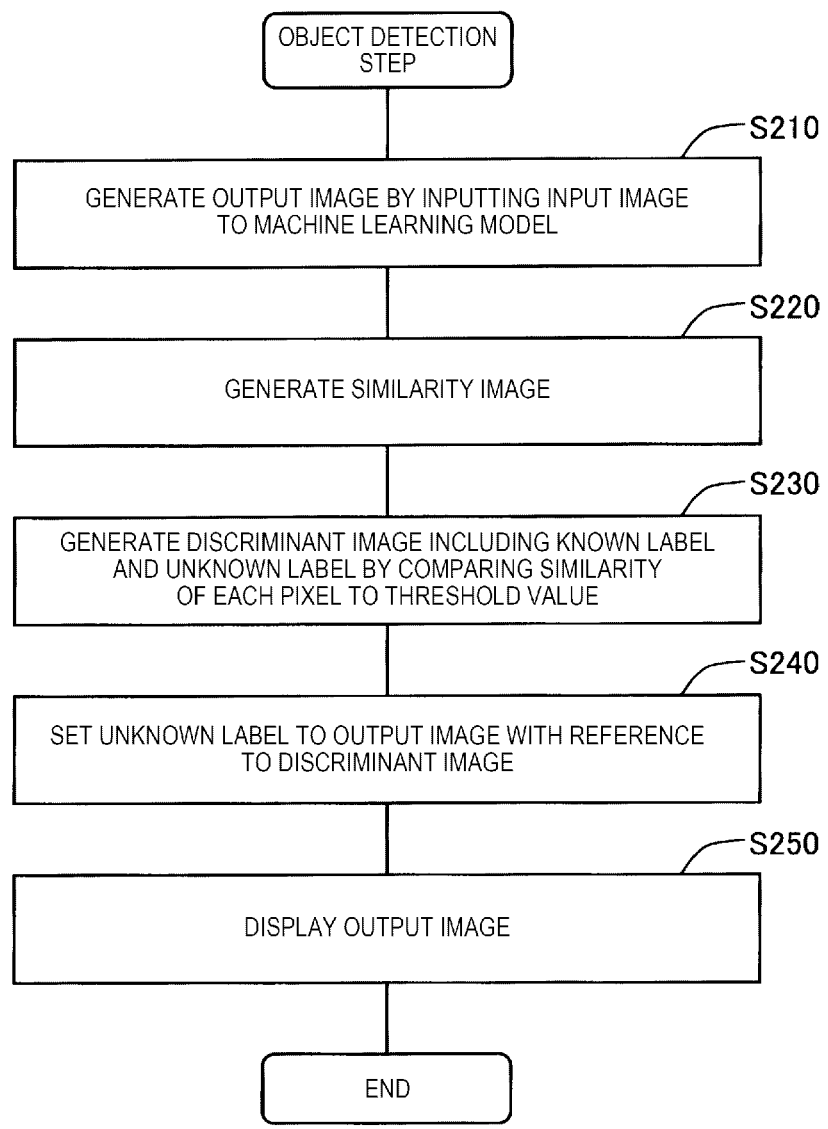
FIG. 10 is a flowchart illustrating a process procedure of an object detection step.
Figure 11:
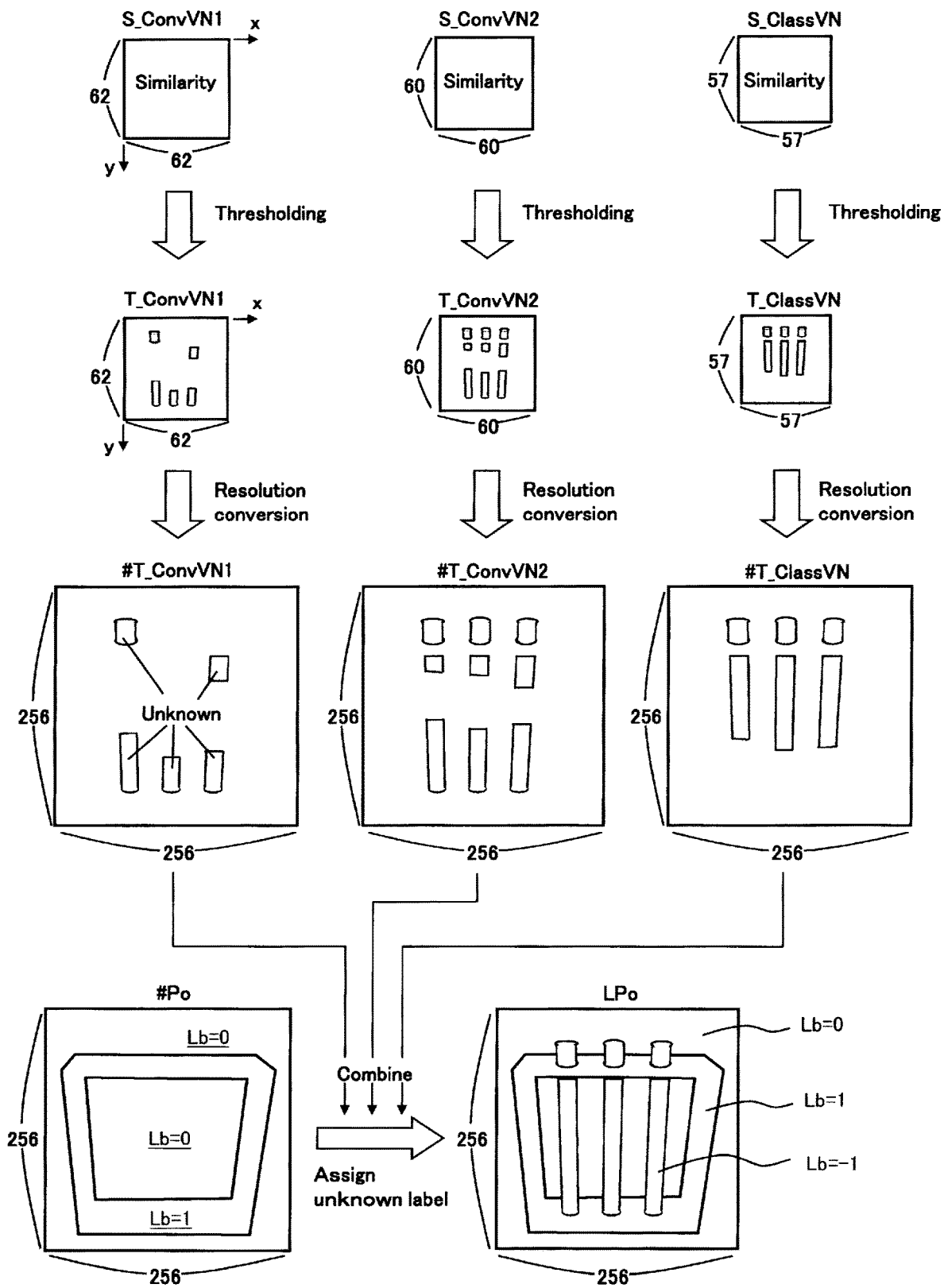
FIG. 11 is a diagram illustrating process contents of Steps S220 to S240.

FIG. 10 is a flowchart illustrating a process procedure of the object detection step using the learned machine learning model 200. FIG. 11 is a diagram illustrating process contents of Steps S220 to S240.

In Step S210, the object detection processing unit 112 inputs an input image Pi to the machine learning model 200, and generates an output image Po in which a known label Lb indicating which of the plurality of classes each pixel belongs to is assigned to each pixel, from the output of the highest layer of the machine learning model 200.

In Step S220, the similarity calculation unit 260 generates similarity images S_ConvVN1, S_ConvVN2, and S_ClassVN from the outputs of the ConvVN1 layer 230, the ConvVN2 layer 240, and the ClassVN layer 250, in response to the input of the input image Pi in Step S210, respectively. A method of generating the similarity image S_ConvVN1 from the output of the ConvVN1 layer 230 will be described below. It can be considered that the similarity calculation unit 260 forms a portion of the object detection processing unit 112.

The similarity image S_ConvVN1 has a resolution which is equal to the resolution of the ConvVN1 layer 230. In the example in FIG. 9, the resolution of the ConvVN1 layer 230 is 62×62, and the size of the similarity image S_ConvVN1 is also 62×62 pixels.

The similarity S(x, y) at each pixel position (x, y) of the similarity image S_ConvVN1 can be obtained using the known feature spectrum group KSG illustrated in FIG. 8, in accordance with an expression as follows.

$$S(x,y)=\max[G\{Sp(x,y),KSp(j)\}] \quad (8)$$

Here, G{a, b} indicates a function of obtaining the similarity between a and b. Sp(x, y) indicates a feature spectrum at the plane position (x, y) of the ConvVN1 layer 230 obtained in response to the input image Pi. KSp(j) indicates all known feature spectra associated with the ConvVN1 layer 230. max[X] indicates a logical calculation that takes the maximum value of X. That is, the similarity S(x, y) at each pixel position (x, y) is the maximum value among similarities between the feature spectrum Sp(x, y) obtained in response to the input image Pi and all known feature spectra KSp(j) obtained in the same ConvVN1 layer 230.

As the function G{a, b} of obtaining the similarity, for example, an expression for obtaining the cosine similarity or an expression for obtaining the similarity in accordance with the distance can be used. It is preferable that the pixel value at each position (x, y) is stored in a form including the similarity S (x, y) and the label Lb associated with the known feature spectrum KSp(j) to which the maximum value is given in the above expression (8). Information on the label Lb may not be included in the pixel value at each position (x, y). For example, it may be sufficient when the unknown portion can be recognized. In this case, the pixel value may be configured so that painting is performed separately in two regions of a known region and an unknown region. The similarity S(x, y) of the similarity image S_ConvVN1 represents the probability that the feature of the class corresponding to the label Lb is present at the pixel position of the input image Pi corresponding to the position (x, y). In other words, the similarity S (x, y) is an index indicating the degree to which the feature at the plane position (x, y) in the layer is similar to the feature of any of the plurality of classes.

The similarity images S_ConvVN2 and S_ClassVN regarding the outputs of the ConvVN2 layer 240 and the ClassVN layer 250 are also generated in the similar manner to the similarity image S_ConvVN1. It is not necessary to generate all the three similarity images S_ConvVN1, S_ConvVN2, and S_ClassVN, but it is preferable to generate one or more of the similarity images. In the present disclosure, the layer that generates the similarity image is also referred to as a "specific layer".

In Step S230 in FIG. 10, the object detection processing unit 112 generates a discriminant image by comparing the similarity of each pixel of the similarity images S_ConvVN1, S_ConvVN2, and S_ClassVN with a predetermined threshold value, and assigning a known label and an unknown label in accordance with the comparison result. In FIG. 11, discriminant images T_ConvVN1, T_ConvVN2, and T_ClassVN are created from the similarity images S_ConvVN1, S_ConvVN2, and S_ClassVN by the process of Step S230, respectively. Each pixel of the similarity image S_ConvVN1 represents the similarity indicating the degree of being similar to the feature of any of the plurality of classes. Therefore, a threshold value for the similarity is set in advance. When the similarity at the pixel position (x, y) of the similarity image S_ConvVN1 is equal to or more than the threshold value, a known label corresponding to the class associated with the similarity is assigned to the pixel position (x, y). When the similarity is less than the threshold value, an unknown label is assigned to the pixel position (x, y). In this manner, the discriminant image T_ConvVN1 is generated. In the present embodiment, there are two known labels of Lb=0 and Lb=1. As the unknown label, for example, Lb=−1 is given. As the threshold value of the similarity, for example, a value in a range of 0.90 to 0.98 can be used.

When the discriminant images T_ConvVN1, T_ConvVN2, and T_ClassVN are created, the unknown label may be assigned without assigning the known label to the pixel position (x, y). For example, the known label is unnecessary for the purpose of specifying an unlearned object position. In other words, at least the unknown label may be assigned to the discriminant images T_ConvVN1, T_ConvVN2, and T_ClassVN.

In Step S240 in FIG. 10, the object detection processing unit 112 sets the unknown label to the output image Po with reference to the discriminant images T_ConvVN1, T_ConvVN2, and T_ClassVN. At this time, first, it is preferable to perform resolution conversion of causing the resolutions of the discriminant images T_ConvVN1, T_ConvVN2, and T_ClassVN to be equal to the resolution of the output image Po. FIG. 11 illustrates a scene in which, by converting all the resolutions of the discriminant images T_ConvVN1, T_ConvVN2, and T_ClassVN to 256×256 pixels being the same as the input image Pi, discriminant images #T_ConvVN1, #T_ConvVN2, and #T_ClassVN after the resolution conversion are generated. FIG. 11 further illustrates an output image #Po obtained by converting the output image Po illustrated in FIG. 9 to 256×256 pixels. As a resolution conversion algorithm, for example, a bicubic method or a nearest neighbor method can be used. The resolution conversion can be omitted.

In Step S240, the object detection processing unit 112 sets the unknown label to the output image #Po with reference to the discriminant images #T_ConvVN1, #T_ConvVN2, and #T_ClassVN. For example, for each pixel position (x, y) of the output image #Po, the labels in the three discriminant images #T_ConvVN1, #T_ConvVN2, and #T_ClassVN are used as the reference. When any one of the labels is the unknown label, the unknown label is assigned to the pixel position (x, y). When all the labels are known labels, the label itself of the output image #Po is adopted. As a result, as illustrated in FIG. 11, an output image LPo in which the known labels Lb=0, Lb=1 and the unknown label Lb=−1 are set is created.

In another embodiment, for each pixel position (x, y) of the output image #Po, the labels in the three discriminant images #T_ConvVN1, #T_ConvVN2, and #T_ClassVN may be used as the reference, and when all the labels are unknown labels, the unknown label may be assigned to the pixel position (x, y). In addition, when any one of the labels is the known label, the label itself of the output image #Po is adopted. Generally, for a plurality of discriminant images generated from the outputs of a plurality of layers, when an unknown label is assigned to a predetermined number of corresponding pixels among the corresponding pixels of the discriminant images, the unknown label may be set to that pixel in the output image Po.

In the process described with reference to FIGS. 10 and 11, it is not necessary to generate the similarity images or the discriminant images from the outputs of the three layers 230, 240, and 250, respectively. The similarity image or the discriminant image may be generated from at least one of the layers 230, 240, and 250. In the present disclosure, the layer used to generate the similarity image or the discriminant image is also referred to as the "specific layer".

When the purpose is to detect only an unknown region, Step S240 for integrating the discriminant image into the output image Po may be omitted. The three discriminant images #T_ConvVN1, #T_ConvVN2, and #T_ClassVN can be integrated, and the resultant of the integration can be used as the output image Lo instead of using the output image Po.

In Step S250 in FIG. 4, the object detection processing unit 112 displays the output image LPo in which the known label and the unknown label are assigned for each pixel. When the output image LPo is displayed, it is preferable to display the output image LPo with different colors for each label.

Figure 12:
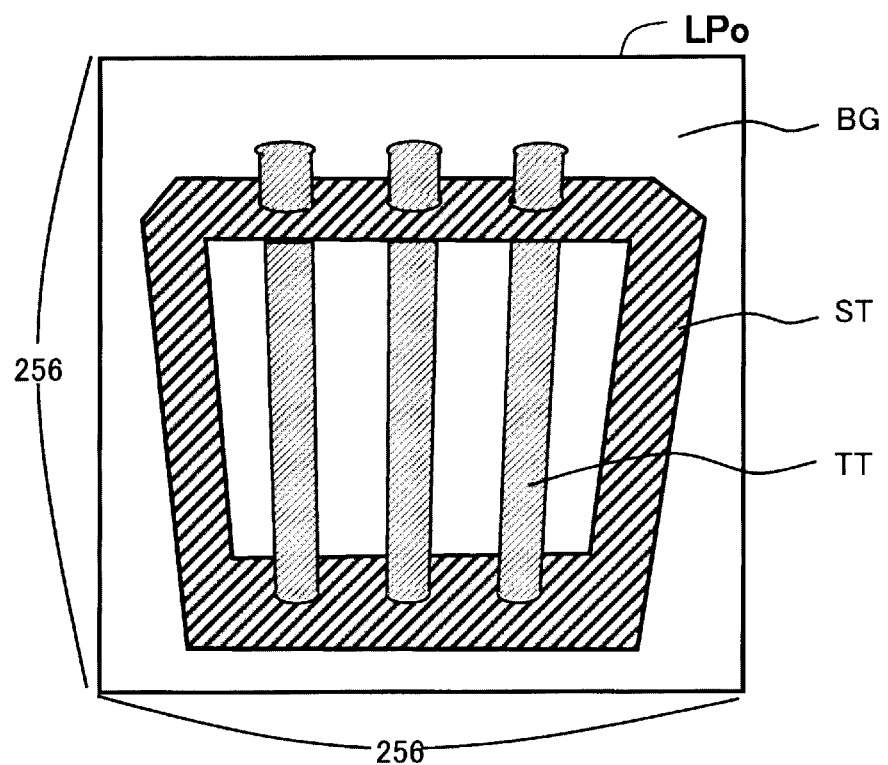
FIG. 12 is a diagram illustrating an output image of the object detection process.

FIG. 12 is a diagram illustrating the output image LPo displayed as a result of the object detection process. In this example, the background BG, the test tube rack ST, and the test tube TT are colored differently. When the output image LPo is displayed, a display image may be created by utilizing the input image Pi to superimpose a translucent layer in which a color unique to the unknown label is provided at the pixel position of the unknown label, on the input image Pi.

In the above embodiment, the output image Po is obtained from the output of the highest layer of the machine learning model 200 in response to the input of the input image Pi, and the output image LPo including the unknown label is obtained using the output image Po. The output image to be presented to the user may be obtained by other methods. For example, at least one of the discriminant images T_ConvVN1, T_ConvVN2, and T_ClassVN, or at least one of the discriminant images #T_ConvVN1, #T_ConvVN2, and #T_ClassVN after the resolution conversion may be presented to the user as the output image.

As described above, in the present embodiment, the input image Pi is input to the learned machine learning model 200, the similarity image is generated from the output of at least one specific layer, and the discriminant image to which at least the unknown label is assigned is generated by comparing the similarity of each pixel in the similarity image to the predetermined threshold value. According to such processes, the unknown label is assigned to the image region of an unknown object, and thus it is possible to detect the unknown object which is present in the input image Pi. In particular, there is an advantage that it is possible to easily detect a transparent object such as a test tube TT.

In the above-described embodiment, the vector neural network for obtaining the output vector by the calculations with the expressions (2) to (5) is used as the machine learning model 200. Instead of this, the capsule network disclosed in U.S. Pat. No. 5,210,798 and WO 2019/083553 may be used.

The method of generating the known spectrum group KSG and the method of generating the output data of an intermediate layer such as the ConvVN1 layer are not limited to the above embodiment. For example, such data may be generated by using the Kmeans method. Such data may be generated by using conversion such as PCA, ICA, or Fisher. The method of converting the known spectrum group KSG and the output data of the intermediate layer may vary.

Other Embodiments

The present disclosure is not limited to the above-described embodiment, and can be realized in various forms without departing from the spirit thereof. For example, the present disclosure can also be realized by the following aspects. The technical features in the above embodiment corresponding to the technical features in the aspects described below can be appropriately replaced or combined in order to solve some or all of the problems of the present disclosure, or to achieve some or all of the effects of the present disclosure. The technical features can be appropriately deleted when the features are not described as being essential in the present specification.

(1) According to a first aspect of the present disclosure, there is provided an object detection method for causing one or more processors to detect an object from an input image by using a vector neural network type machine learning model having a plurality of vector neuron layers. The machine learning model is configured to, when a patch image having a predetermined size smaller than the input image is input to the machine learning model, output a determination value indicating that the patch image belongs to one of a plurality of classes. The object detection method includes generating a similarity image by inputting the input image to the machine learning model, and obtaining a similarity from an output of at least one specific layer among the plurality of vector neuron layers for each pixel of the specific layer, the similarity indicating a degree of being similar to a feature of any class among the plurality of classes, and generating a discriminant image including at least an unknown label by comparing the similarity of each pixel in the similarity image to a predetermined threshold value, and, when the similarity is less than the threshold value, assigning the unknown label to the pixel.

According to this object detection method, since the unknown label is assigned to the image region of an unknown object, it is possible to detect an unknown object which is present in an input image, by a method different from template matching.

(2) In the object detection method, in the generating of the discriminant image, when the similarity is equal to or more than the threshold value, a known label corresponding to the class associated with the similarity may be assigned to the pixel.

According to this object detection method, it is possible to identify a known object and an unknown object, from a discriminant image to which the known label and the unknown label are assigned.

(3) In the object detection method, the generating of the similarity image may include generating an output image from an output of the machine learning model in response to the input of the input image, the output image in which a known label indicating the class to which the output image belongs among the plurality of classes is assigned to each pixel. The generating of the discriminant image may include setting the unknown label to some pixels of the output image with reference to the discriminant image.

According to this object detection method, it is possible to obtain an output image in which the unknown label is set in the image region of the unknown object.

(4) In the object detection method, the generating of the discriminant image may further include performing resolution conversion of causing a resolution of the discriminant image to be equal to a resolution of the output image.

According to this object detection method, since the resolutions of the discriminant image and the output image are caused to be equal to each other, it is possible to easily set the unknown label in the output image with reference to the discriminant image.

(5) In the object detection method, two or more specific layers may be provided. The generating of the similarity image may include obtaining the similarity image for each of the two or more specific layers. The generating of the discriminant image may include obtaining the discriminant image for each of the two or more specific layers, and, when the unknown label is assigned to a predetermined number of corresponding pixels among corresponding pixels of the discriminant image for each of the two or more specific layers for each pixel of the output image, setting the unknown label to the pixel of the output image.

According to this object detection method, when the unknown label is assigned to a predetermined number of corresponding pixels among the corresponding pixels of the discriminant images obtained for two or more specific layers, the unknown label is set to the pixel in the output image. Thus, it is possible to more accurately set the unknown label.

(6) In the above object detection method, the specific layer may have a configuration in which vector neurons disposed in a plane defined by two axes of a first axis and a second axis are disposed as a plurality of channels along a third axis in a direction different from the two axes. The generating of the similarity image may include obtaining any feature spectrum for each pixel of the specific layer among a first type of feature spectrum in which a plurality of element values of an output vector of a vector neuron at one plane position in the specific layer are arranged over the plurality of channels along the third axis, a second type of feature spectrum obtained by multiplying each element value in the first type of feature spectrum by an activation value corresponding to a vector length of the output vector, and a third type of feature spectrum in which the activation value at one plane position in the specific layer is arranged over the plurality of channels along the third axis, and obtaining the similarity by applying a predetermined calculation expression to the feature spectrum obtained for each pixel of the specific layer in response to the input of the input image and a known feature spectrum group obtained from the output of the specific layer when a plurality of patch images to which any of a plurality of known labels is assigned are input to the machine learning model.

According to this object detection method, it is possible to obtain the similarity by using any of three types of feature spectra obtained from the output vector of the vector neuron.

(7) According to a second aspect of the present disclosure, there is provided an object detection apparatus that detects an object from an input image. The object detection apparatus includes a memory that stores a vector neural network type machine learning model having a plurality of vector neuron layers, and one or more processors that execute an object detection process using the machine learning model. The machine learning model is configured to, when a patch image having a predetermined size smaller than the input image is input to the machine learning model, output a determination value indicating that the patch image belongs to one of a plurality of classes. The one or more processors are configured to perform generating a similarity image by inputting the input image to the machine learning model, and obtaining a similarity from an output of at least one specific layer among the plurality of vector neuron layers for each pixel of the specific layer, the similarity indicating a degree of being similar to a feature of any class among the plurality of classes, and generating a discriminant image including at least an unknown label by comparing the similarity of each pixel in the similarity image to a predetermined threshold value, and, when the similarity is less than the threshold value, assigning the unknown label to the pixel.

According to this object detection apparatus, since the unknown label is assigned to the image region of an unknown object, it is possible to detect an unknown object which is present in an input image, by a method different from template matching.

(8) According to a third aspect of the present disclosure, there is provided a non-transitory computer-readable storage medium storing a program causing a processor to execute an object detection process of detecting an object from an input image using a vector neural network type machine learning model having a plurality of vector neuron layers. The machine learning model is configured to, when a patch image having a predetermined size smaller than the input image is input to the machine learning model, output a determination value indicating that the patch image belongs to one of a plurality of classes. The computer program causes the processor to execute a process of generating a similarity image by inputting the input image to the machine learning model, and obtaining a similarity from an output of at least one specific layer among the plurality of vector neuron layers for each pixel of the specific layer, the similarity indicating a degree of being similar to a feature of any class among the plurality of classes, and a process of generating a discriminant image including at least an unknown label by comparing the similarity of each pixel in the similarity image to a predetermined threshold value, and, when the similarity is less than the threshold value, assigning the unknown label to the pixel.

According to this computer program, since the unknown label is assigned to the image region of an unknown object, it is possible to detect an unknown object which is present in an input image, by a method different from template matching.

The present disclosure can also be realized in various forms other than the above aspects. For example, the present disclosure can be realized in forms of a computer program for implementing the functions of the object detection apparatus, a non-transitory storage medium in which the computer program is recorded, and the like.

What is claimed is:

1. An object detection method of causing one or more processors to detect an object from an input image, by using a vector neural network type machine learning model having a plurality of vector neuron layers, the vector neuron layers having different channels, kernel sizes and strides, the machine learning model being configured to, when a patch image having a predetermined size smaller than the input image is input to the machine learning model, output a determination value indicating that the patch image belongs to one of a plurality of classes, the object detection method comprising:

generating a similarity image by inputting the input image to the machine learning model, and obtaining a similarity from an output of at least one specific layer among the plurality of vector neuron layers for each pixel of the specific layer, the similarity indicating a degree of being similar to a feature of any class among the plurality of classes; and generating a discriminant image including at least an unknown label by comparing the similarity of each pixel in the similarity image to a predetermined threshold value, and, when the similarity is less than the predetermined threshold value, assigning the unknown label to the pixel, wherein the generating of the similarity image includes generating an output image from an output of the machine learning model in response to the input of the input image, the output image in which a known label indicating the class to which the output image belongs among the plurality of classes is assigned to each pixel, the generating of the discriminant image includes setting the unknown label to some pixels of the output image with reference to the discriminant image, two or more specific layers are provided, the generating of the similarity image includes obtaining the similarity image for each of the two or more specific layers, and the generating of the discriminant image includes obtaining the discriminant image for each of the two or more specific layers, and when the unknown label is assigned to a predetermined number of corresponding pixels among corresponding pixels of the discriminant image for each of the two or more specific layers for each pixel of the output image, setting the unknown label to the pixel of the output image.

2. The object detection method according to claim 1, wherein the generating of the discriminant image includes, when the similarity is equal to or more than the predetermined threshold value, assigning a known label to the pixel, the known label corresponding to the class associated with the similarity.

3. The object detection method according to claim 1, wherein the generating of the discriminant image further includes performing resolution conversion of causing a resolution of the discriminant image to be equal to a resolution of the output image.

4. A non-transitory computer-readable storage medium storing a program causing a processor to execute an object detection process of detecting an object from an input image using a vector neural network type machine learning model having a plurality of vector neuron layers, the vector neuron layers having different channels, kernel sizes and strides, the machine learning model being configured to, when a patch image having a predetermined size smaller than the input image is input to the machine learning model, output a determination value indicating that the patch image belongs to one of a plurality of classes, the program causes the processor to execute:

a process of generating a similarity image by inputting the input image to the machine learning model, and obtaining a similarity from an output of at least one specific layer among the plurality of vector neuron layers for each pixel of the specific layer, the similarity indicating a degree of being similar to a feature of any class among the plurality of classes; and a process of generating a discriminant image including at least an unknown label by comparing the similarity of each pixel in the similarity image to a predetermined threshold value, and, when the similarity is less than the predetermined threshold value, assigning the unknown label to the pixel, wherein the generating of the similarity image includes generating an output image from an output of the machine learning model in response to the input of the input image, the output image in which a known label indicating the class to which the output image belongs among the plurality of classes is assigned to each pixel, the generating of the discriminant image includes setting the unknown label to some pixels of the output image with reference to the discriminant image, two or more specific layers are provided, the generating of the similarity image includes obtaining the similarity image for each of the two or more specific layers, and the generating of the discriminant image includes obtaining the discriminant image for each of the two or more specific layers, and when the unknown label is assigned to a predetermined number of corresponding pixels among corresponding pixels of the discriminant image for each of the two or more specific layers for each pixel of the output image, setting the unknown label to the pixel of the output image.

* * * * *